US006266860B1

(12) United States Patent
Kiebler

(10) Patent No.: US 6,266,860 B1
(45) Date of Patent: Jul. 31, 2001

(54) PULLER FOR REMOVING A PULLEY FROM A SHAFT

(76) Inventor: Patrick J. Kiebler, R.D. 2, Box 160A, Export, PA (US) 15632

( * ) Notice: Subject to any disclaimer, the term of this patent is extended or adjusted under 35 U.S.C. 154(b) by 0 days.

(21) Appl. No.: 09/596,788

(22) Filed: Jun. 19, 2000

(51) Int. Cl.[7] .................................................... B23P 19/04

(52) U.S. Cl. ................................................ 29/259; 29/261

(58) Field of Search ............................. 29/261, 259, 258, 29/266, 256, 252, 244, 242, 270, 278

(56) References Cited

U.S. PATENT DOCUMENTS

| | | | | |
|---|---|---|---|---|
| 1,227,457 | * | 5/1917 | Langan | 29/259 |
| 1,870,711 | * | 8/1932 | Cooney | 29/261 |
| 2,860,407 | | 11/1958 | Grunder . | |
| 3,059,327 | | 10/1962 | Burrows . | |
| 3,174,218 | | 3/1965 | McConaha . | |
| 3,599,311 | * | 8/1971 | Ellis | 29/259 |
| 4,235,004 | | 11/1980 | Floyd . | |
| 4,451,977 | | 6/1984 | Matthews . | |
| 4,502,197 | * | 3/1985 | Harder | 29/259 |
| 4,672,731 | * | 6/1987 | Taylor | 29/259 |
| 4,908,925 | | 3/1990 | Johnson . | |
| 5,058,256 | | 10/1991 | Taylor . | |

FOREIGN PATENT DOCUMENTS

| | | | | |
|---|---|---|---|---|
| 1060277 | * | 7/1952 | (FR) | 29/259 |

* cited by examiner

*Primary Examiner*—Joseph J. Hail, III
*Assistant Examiner*—Daniel Shanley
(74) *Attorney, Agent, or Firm*—Ronald S. Lombard

(57) ABSTRACT

A puller useful in removing a pulley assembly from a crankshaft is provided by the present invention. The puller is particularly useful for removing a multiple pulley assembly where the pulleys may be damaged as a result of too much force on the outer part of the pulley. The puller is easily mounted in very tight locations and applies a force to the pulley assembly along the hub of the pulley so as not to damage the pulleys.

6 Claims, 10 Drawing Sheets

PULLER FOR REMOVING A PULLEY FROM A SHAFT

BACKGROUND OF THE INVENTION

The present invention relates to a puller for removing a pulley assembly from a crankshaft and, in particular, to a pulley remover for removing a double pulley-type assembly that is common on small lawn and garden tractors. Such tractors use small internal combustion motors which are vertically mounted in the tractor with the motor output or crankshaft extending vertically downward toward the ground. The double or multiple pulley assembly is firmly mounted on the crankshaft. Typically, in such small lawn and garden tractors, the double pulley assembly includes a smaller diameter pulley for receiving the transmission belt mounted above a larger diameter pulley for receiving the mower belt.

If the small lawn and garden tractor motor requires removal from the tractor for service, the double or multiple pulley assembly first has to be removed from the crankshaft. The pulley assembly is often force-fit on the crankshaft and without a puller, such as the present invention, the pulley assembly, because of its flimsy structure, is very often destroyed during removal from the crankshaft, thereby requiring a new pulley assembly to be supplied when reassembling the tractor, resulting in additional cost.

Various pullers have been disclosed in the past, such as, U.S. Pat. No. 4,235,004, dated Nov. 25, 1980, issued to William G. Floyd, which discloses a puller adapted for removing pulleys from the shafts of engines, such as lawn-mower engines, small tractor engines, etc. The Floyd patent discloses a puller including a generally box-like member of heavy steel plates with one wall open. A jack screw is threaded through one sidewall for engagement with the end of a crankshaft to which the pulley assembly is mounted. A U-shaped spacer tool having an enlarged portion and a reduced shoulder portion is placed between the central or hub portion of the pulley on the side of the frame opposite that through which the jack screw passes. The reduced shoulder portion of the U-shaped spacer is effective to transmit the thrust from the jackscrew to the central or hub portion of the pulley. The pulley assemblies are removed from under the tractor. Problems may rise though with the Floyd design in that the box-like member may be very difficult to get into position on the double or multiple pulley combination because of the lack of sufficient working space under the tractor. Also, the box design does not allow adjustment for different sizes of pulley combinations and the U-shaped spacer would be difficult to position above the upper most pulley for the same reasons.

Other pullers are known in the art such as in U.S. Pat. No. 3,174,218, dated Mar. 23, 1965, issued to Thomas 0. McConaha, there is disclosed a bearing removal and installation device specifically adapted for removing a bearing from an axle. Although such a device would work for bearings, it would not work for the double or multiple pulley assemblies used on small tractors because of their flimsy nature.

In U.S. Pat. No. 3,059,327, dated Oct. 23, 1962, issued to Allen Burrows, is disclosed a pulley removing device for removing pulleys from a generator. The pulley removing device utilizes a pair of flanges that engage the groove in the pulley. Such a pulley removing device requires a strong pulley structure that will not have the walls of the pulley collapse in the area of the grooves when the device is used.

SUMMARY OF THE INVENTION

The present invention provides a puller useful in the removal of a pulley assembly from a crankshaft. Such a pulley assembly typically includes at least one pulley affixed to a hollow tubular member. The hollow tubular member is fixedly mounted on the crankshaft. The one pulley typically has a central aperture passing through it and is positioned proximate one end of the crankshaft. Usually, the crankshaft has a crankshaft aperture at the one end. The puller includes a pair of oppositely disposed thrust plate members. Each of the thrust plate members have thrust plate joining bolt apertures passing therethrough. The joining bolt apertures of one of the thrust plate members is in alignment with the joining bolt apertures of the other thrust plate member when they are in operative relationship. Thrust plate joining bolt members pass through the aligned joining bolt apertures. The joining bolt members preferably each have a threaded portion in one end thereof. Joining bolt nut members are provided in threaded engagement with the threaded portion of the joining bolt members. Each of the thrust plate members have a hollow tubular member engagement portion in the periphery thereof. The thrust plate members further include a semi-circular pulley hub push members affixed to the plate members at the tubular member engagement portion. Preferably the pulley hub push members are of predetermined length and are coaxially aligned with the hollow tubular member when in operative arrangement with the pulley assembly.

A pulley butt plate member has a jackscrew aperture passing through it in coaxial alignment with the crankshaft. A threaded jack screw receiving member is provided in coaxial alignment with a jack screw aperture. Also included is a threaded jackscrew assembly sized to operatively engage the receiving member. The pulley butt plate member has connecting bolt apertures passing therethrough. The thrust plate members have threaded portions at the periphery at the connecting bolt apertures. The connecting bolt apertures of the pulley butt plate member and the thrust plate members are oppositely disposed and are in alignment when in operative relationship. Also included are connecting bolt members each passing through the oppositely disposed connecting bolt apertures and in engagement with the threaded portions of the thrust plate member.

Utilizing the puller of the present invention, when the puller is operatively positioned on the pulley assembly, the jackscrew assembly may be progressively tightened so as to exert a push on the crankshaft resulting in the pulley hub push members of the thrust plate members exerting a force against the hub of the one pulley, thereby causing the pulley assembly to separate from the crankshaft for easy removal without damage to the pulley assembly.

Preferably, the pulley hub push members have a length greater than one half the width of the grooved rim of the one pulley. Preferably the jackscrew assembly includes a threaded jackscrew having a central conical extension portion nearest the crankshaft when in operative position. In the case where the crankshaft aperture is threaded, the jackscrew may further preferably comprise an extension member sized to fit through the central pulley aperture and engage the threaded portion of the crankshaft proximate the crankshaft aperture. Preferably, the extension member at one end thereof has a central recess therein shaped to mate with the conical extension portion of the jackscrew. Preferably, the extension member at the other end is threaded, whereby the extension member may screw into the threaded portion of the crankshaft.

BRIEF DESCRIPTION OF THE DRAWINGS

For a better understanding of the invention, reference may be had to the accompanying drawings exemplary of the invention in which.

BRIEF DESCRIPTION OF THE PREFERRED EMBODIMENTS

Figure 1:
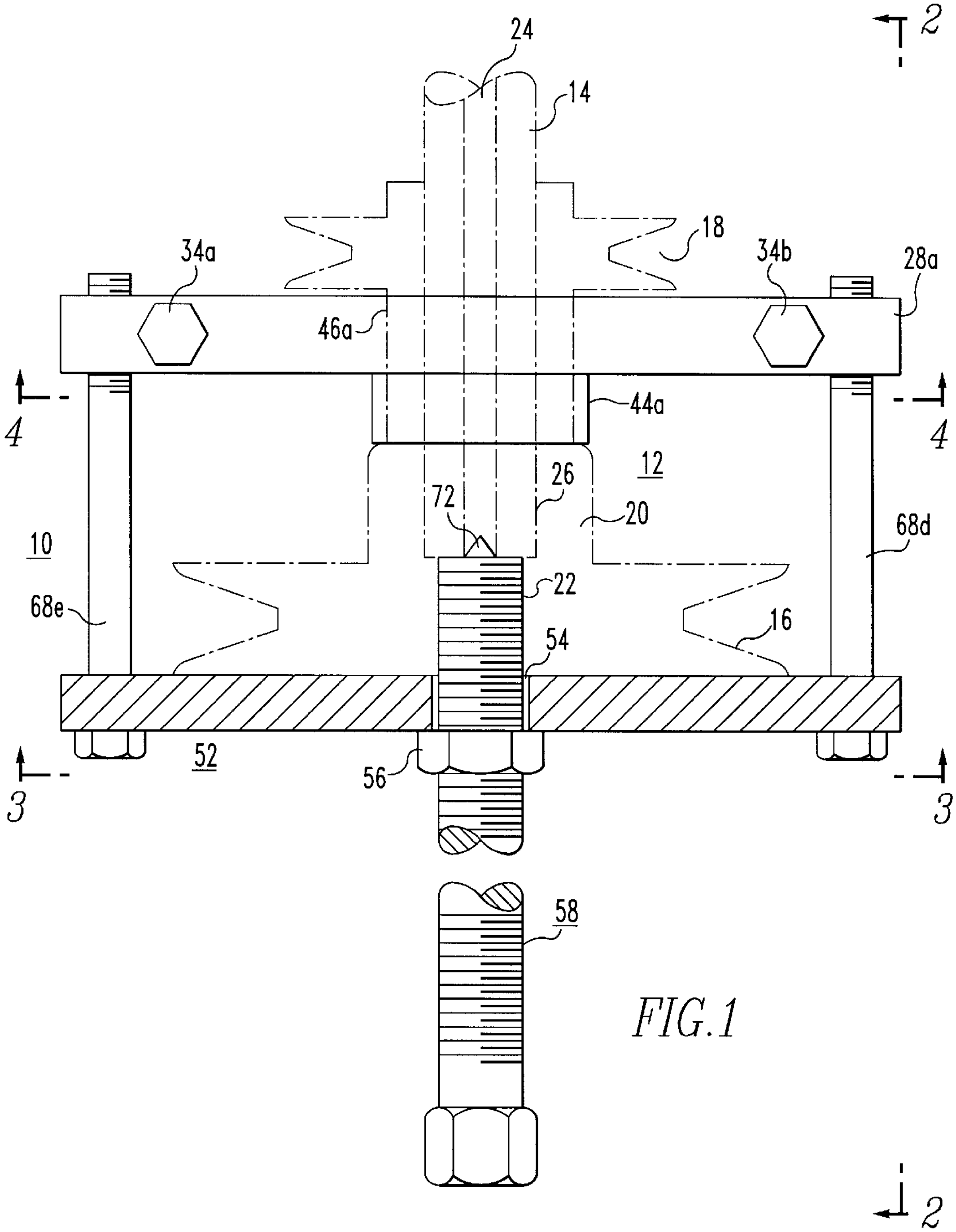
FIG. 1 is an elevational view of the puller of the present invent on in operative position to remove the pulley assembly from a crankshaft.
Figure 2:
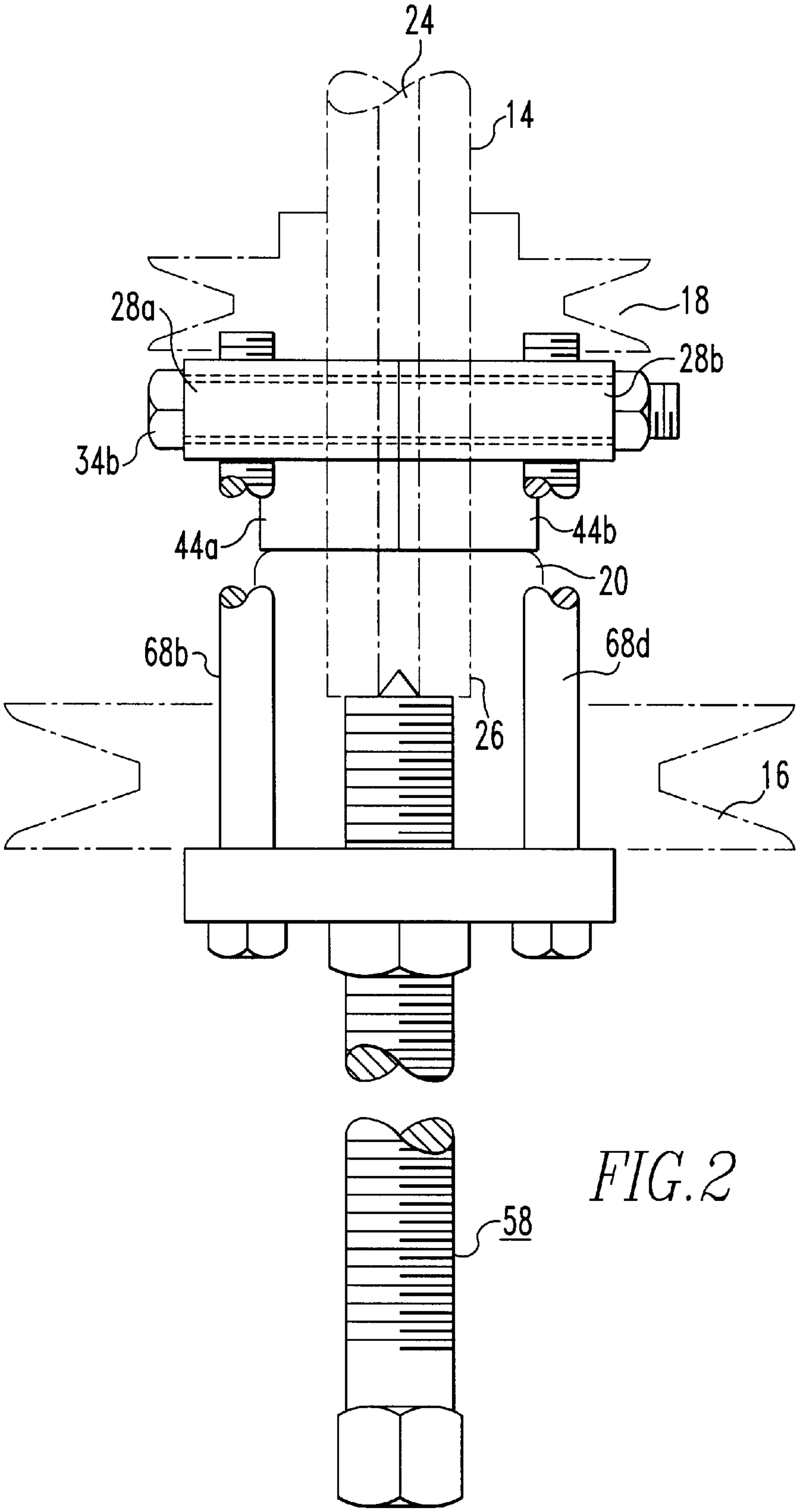
FIG. 2 aside elevational view of the puller in operative position as shown in FIG. 1.
Figure 6:
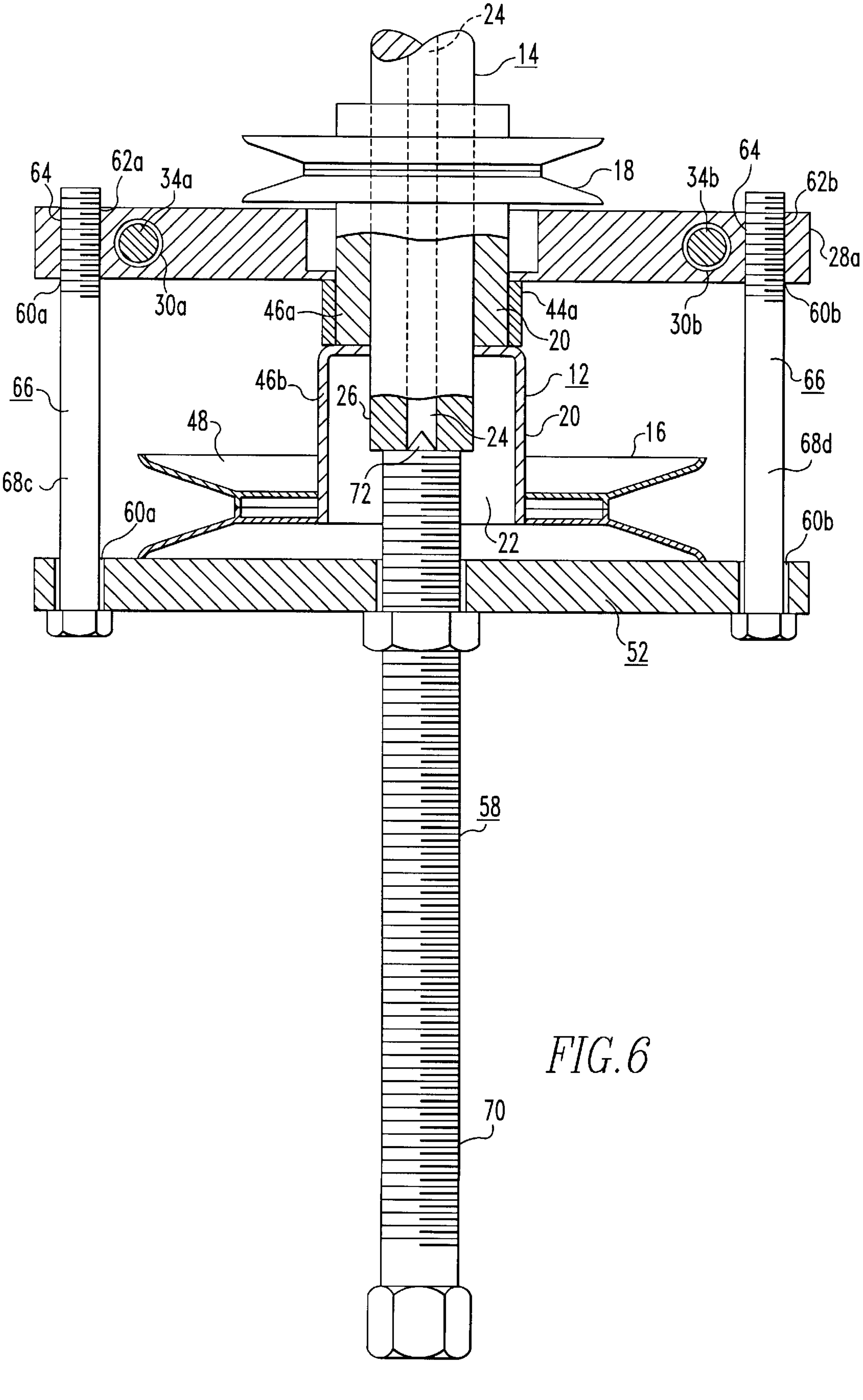
FIG. 6 s a elevational view partly in section of the puller and pulley assembly shown in FIG. 1 showing the position of the crankshaft before removal.
Figure 10:
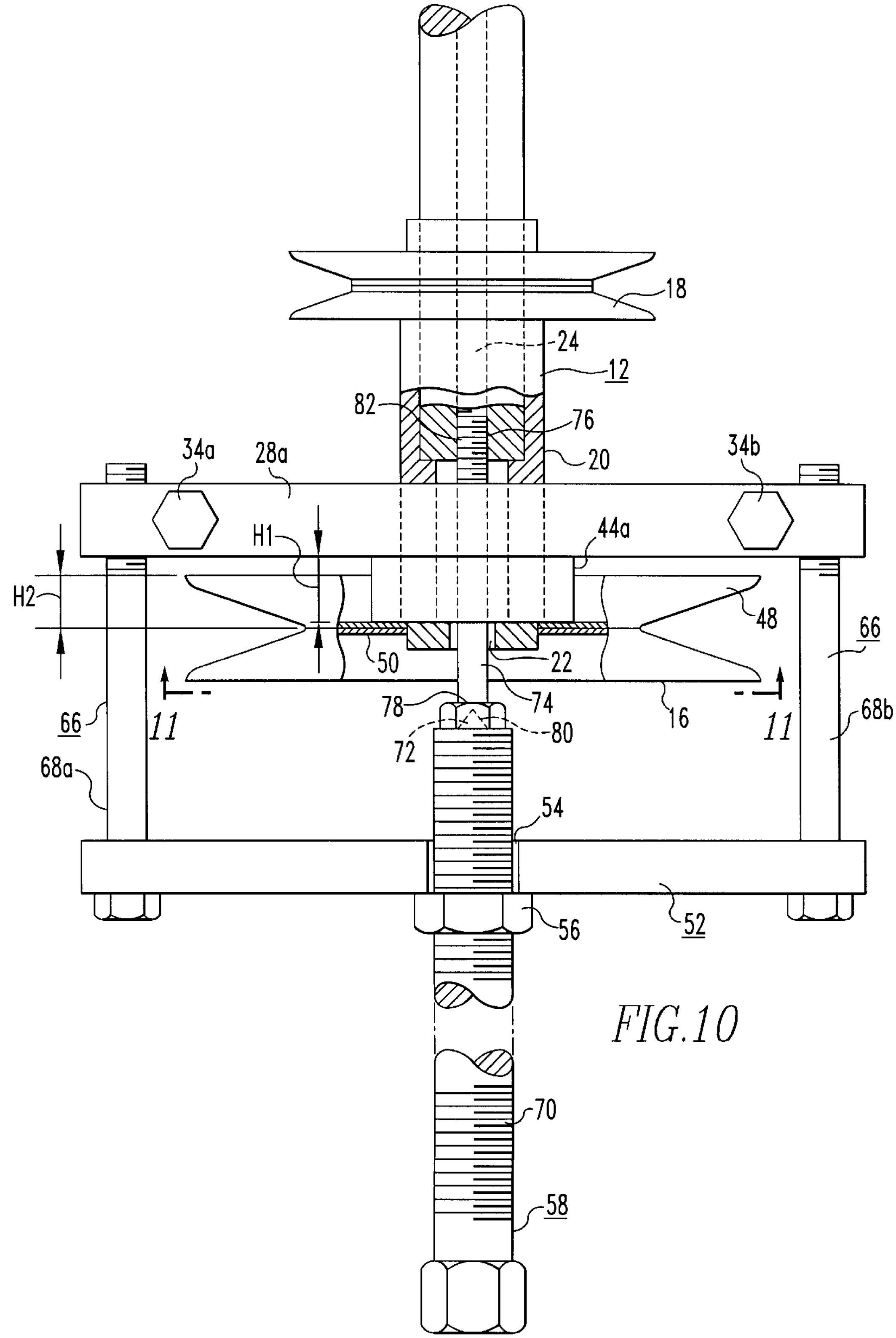
FIG. 10 is an elevational view partly in section of the puller in operative position with the type of pulley assembly shown in FIG. 8.
Figure 11:
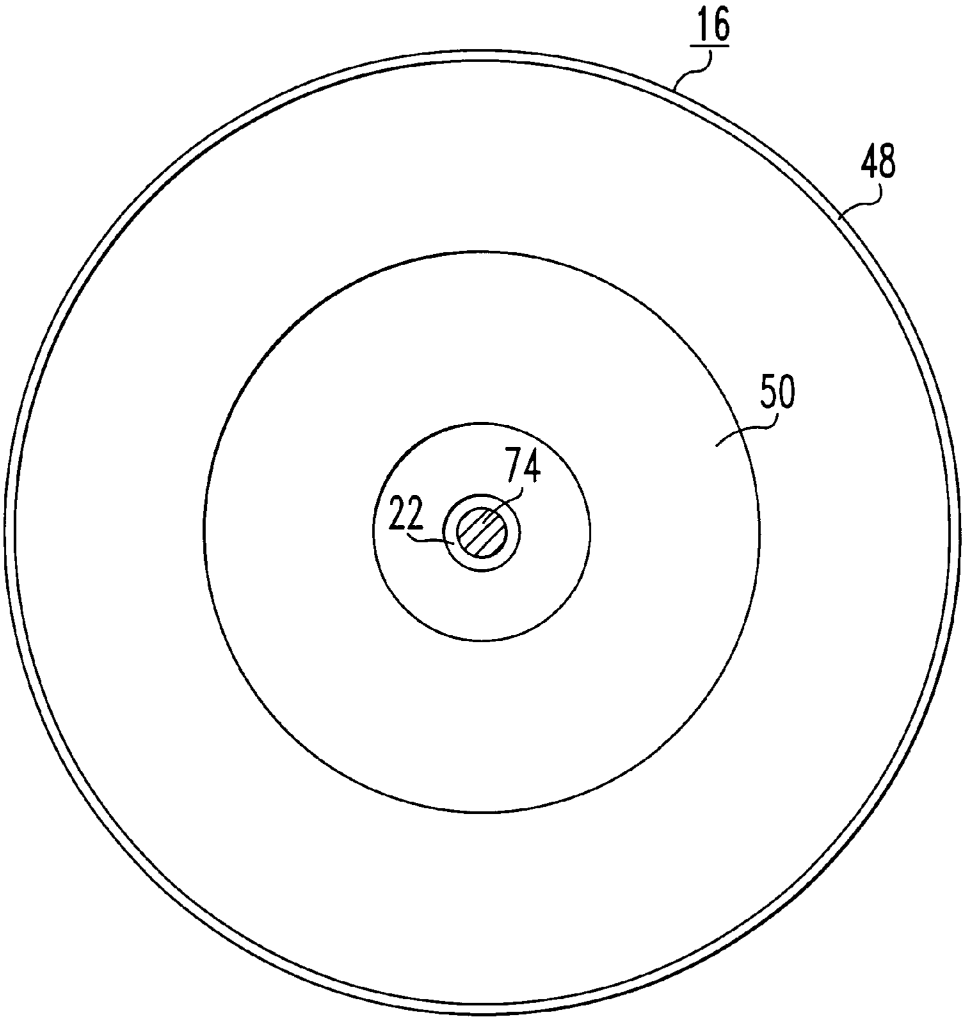
FIG. 11 is a cross-sectional view taken along the line 11—11 of FIG. 10.

With reference to FIG. 1, areas showing a puller 10 of the present invention in operative position over one type of typical multiple pulley assembly 12. As stated previously, such pulley assemblies are commonly used on small lawn and garden tractors which normally have vertically mounted motors with the crankshaft being vertical to the ground and the pulley assembly being mounted on the end of the crankshaft. The pulley assembly 12 includes at least one pulley 16 as shown in FIGS. 1, 2 and 6, for example. The one pulley 16, in the lawn and garden tractor configuration, is a large pulley closest to the ground for receiving the mower deck belt. Often a second pulley 18 is included for receiving the tractor transmission belt. Both pulleys 16 and 18 are mounted on a hollow tubular member 20 as shown in FIG. 6 and 10. The hollow tubular member 20 is firmly mounted on the crankshaft 14 because of the close tolerances between the outside diameter of the crankshaft 14 and the inside diameter of the hollow tubular member 20. The one pulley 16 has a central aperture 22 as shown in FIGS. 6, 9, 10, and 11. The crankshaft 14 usually has a crankshaft aperture 24 passing axially through the center of the crankshaft 14 at one end 26 thereof.

Figure 4:
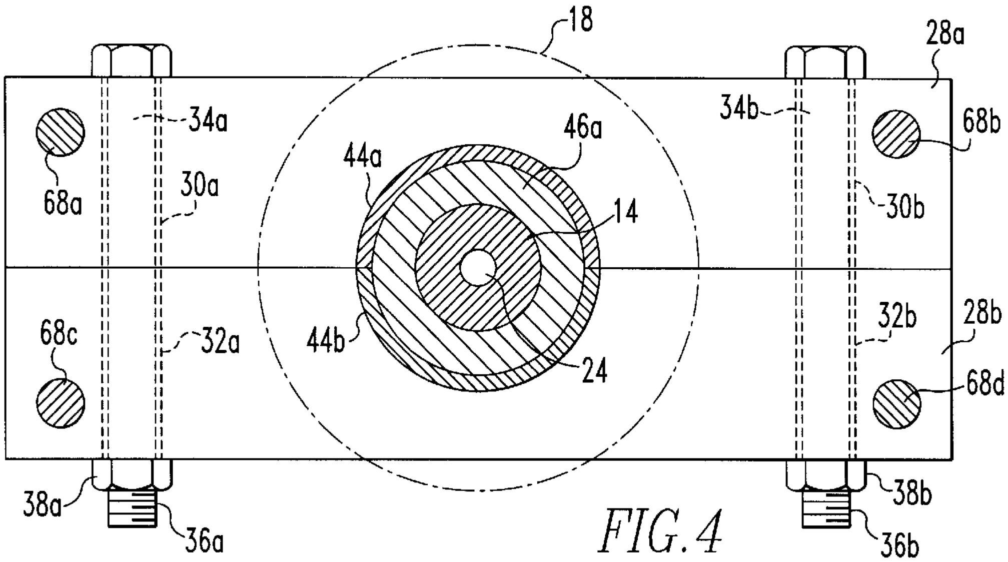
FIG. 4 is cross-sectional view taken along the line 4—4 of FIG. 1.
Figure 5:
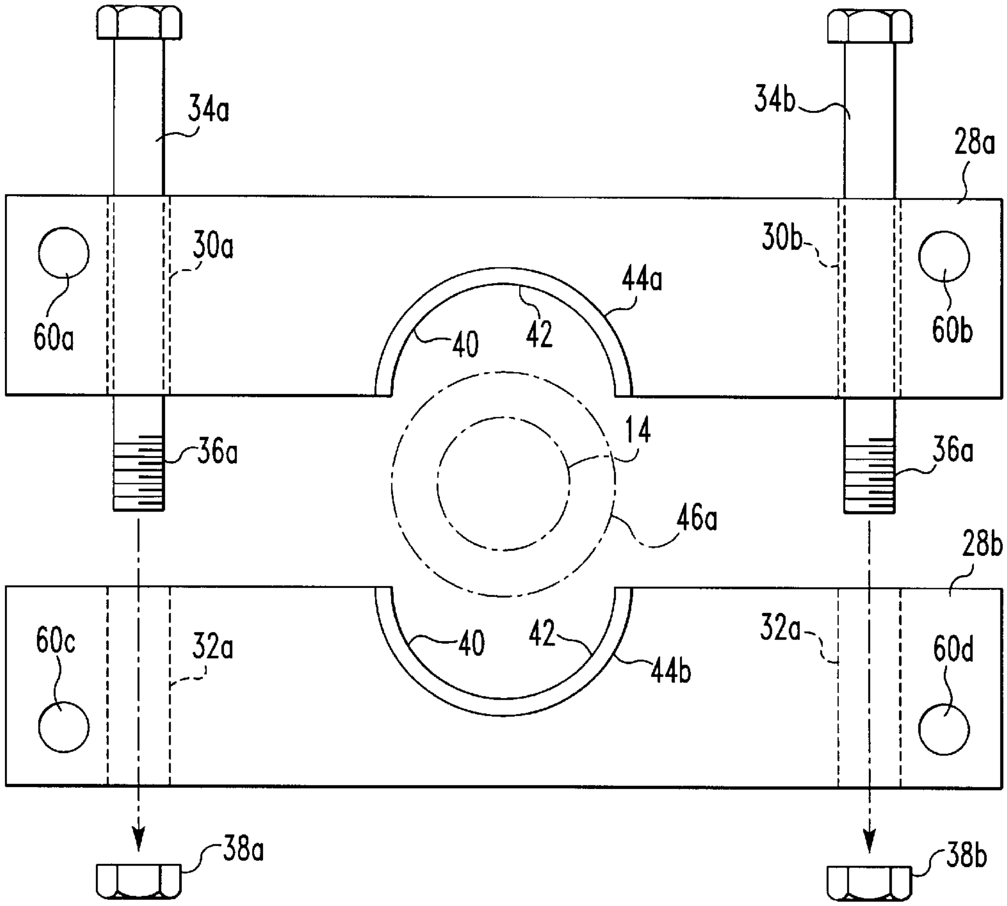
FIG. 5 is an elevational view of the thrust plate members in alignment before being put into operative relationship the pulley assembly.

The puller 10 of the present invention comprises a pair 28*a*, 28*b* of oppositely disposed thrust plate members as shown in FIGS. 4 and 5. Each of the thrust plate members 28*a*, 28*b* include thrust plate joining bolt apertures 30*a*, 30*b* and 32*a*, 32*b* passing through the thrust plate members as shown in FIGS. 4 and 5. As can be seen in those figures, the joining bolt apertures 30*a*, 30*b* of the one thrust plate member 28*a* is in alignment with the joining bolt apertures 32*a*, 32*b* of the other 28*b* of the thrust plate members when they are in operative relationship. Thrust plate joining bolt members 34*a*, 34*b* each pass through the respective aligned joining bolt apertures 30*a*, 32*a* and 30*b* and 32*b* shown in FIG. 4. The joining bolt members 34*a*, 34*b* preferably each have a threaded portion 36*a*, 36*b* at their respective ends as shown in FIG. 5. Joining bolt nut members 38*a*, 38*b* are in threaded engagement with the threaded portions 36*a*, 36*b* of the respective joining bolt members 34*a*, 34*b*.

Figure 8:
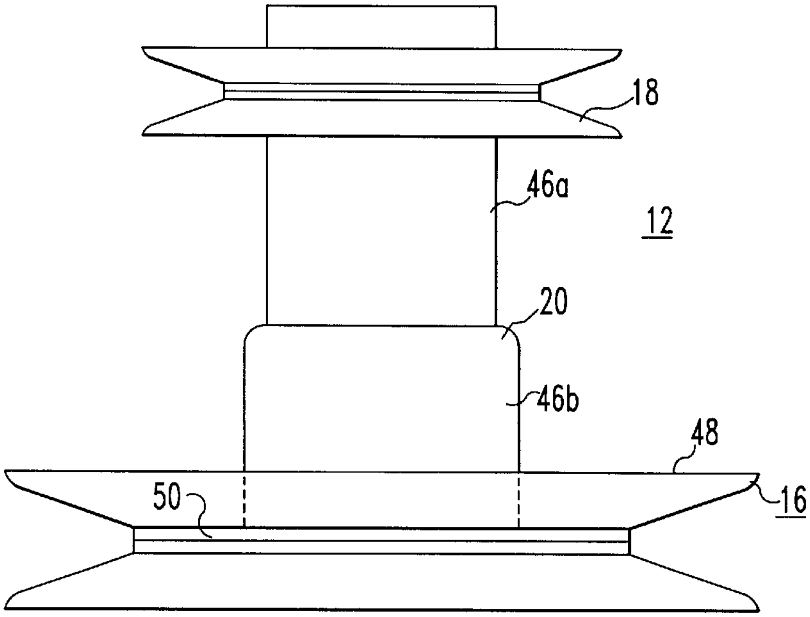
FIG. 8 is an elevational view of another type of double pulley assembly.
Figure 9:
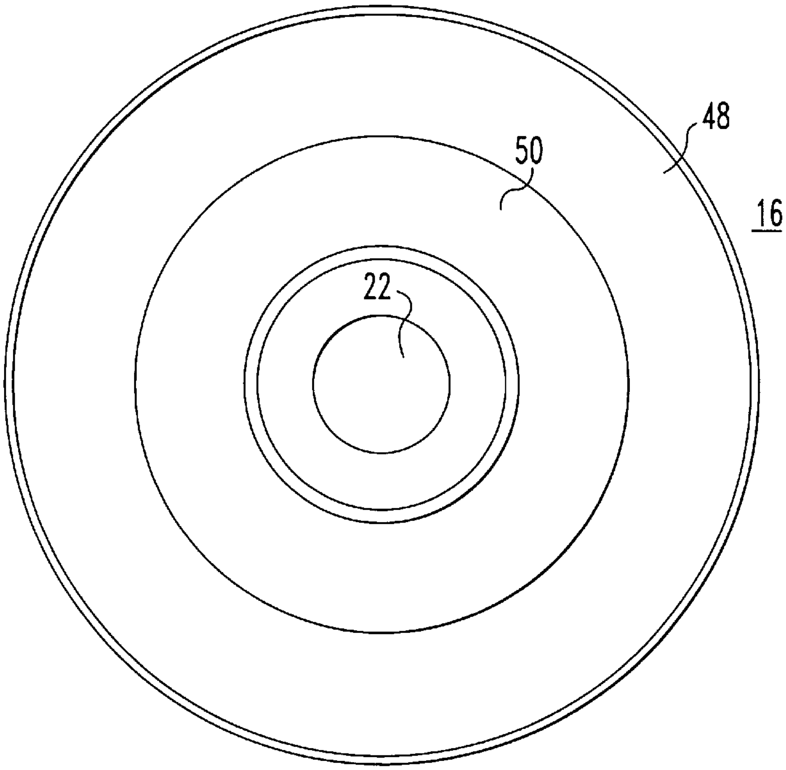
FIG. 9 is a plan view looking in at the large pulley of FIG. 8.

Each of the thrust plate members 28*a*, 28*b* have a hollow tubular member engagement portion 40 in its periphery 42. The thrust plate members 28*a*, 28*b* also include semi-circular pulley hub push members 44*a*, 44*b* affixed to the thrust plate members 28*a*, 28*b* at the tubular member engagement portion 40 as shown in FIG. 5. The pulley hub push members 44*a*, 44*b* are of predetermined length and are coaxially aligned with the hollow tubular member as shown in FIGS. 2, 6, and 10, for example, when in operative arrangement with the pulley assembly 12. FIGS. 8 and 10 show two different configurations of the pulley assembly 12. The pulley assembly 12 shown in FIG. 8 consists of a hollow tubular member 20 carrying the two pulleys 16 and 18. This configuration of the hollow tubular member 20, as can be seen from FIG. 8, has a small diameter portion 46*a* and a large diameter portion 46*b* located between the two pulleys 16 and 18. The other configuration shown in FIG. 10 shows the hollow tubular member 20 being of the same diameter between the two pulleys 16 and 18. The puller 10 of the present invention works with either pulley configuration as shown in FIGS. 6 and 10. The length of the pulley hub push members 44*a*, 44*b* becomes important especially when removing a pulley assembly of the configuration shown in FIG. 10. As shown in FIG. 10 the pulley hub push members 44*a*, not shown, and 44*b* must be of a length hi greater than one-half the width h2 of the pulley 16 to prevent the thrust plate members 28*a*, 28*b* from contacting the rim 48 of the one pulley 16 to prevent the puller from damaging the rim of the pulley which can be quite flimsy compared to the central hub portion 50 of the one pulley 16.

Figure 3:
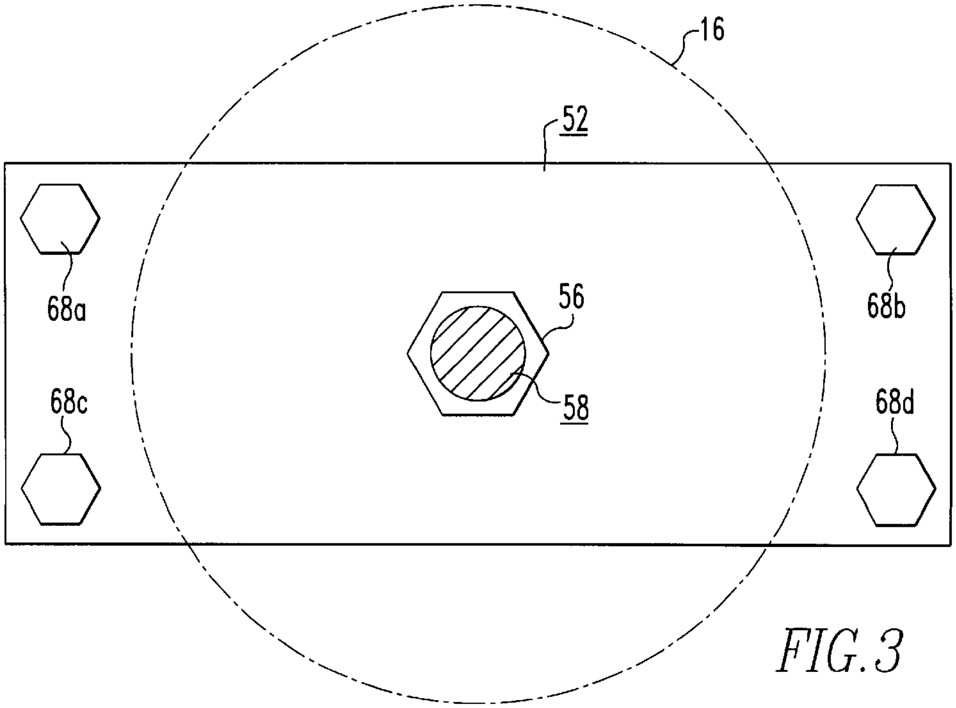
FIG. 3 is a cross-sectional view taken along the line 3—3 of FIG. 1.

With reference to FIGS. 1 and 3 there is shown a pulley butt plate member 52 having a jackscrew aperture 54 passing therethrough in coaxial alignment with the crankshaft 14. A threaded jackscrew receiving member 56 is provided in coaxial alignment with the jackscrew aperture. The threaded jackscrew receiving member 56 may be attached to the pulley butt plate member 52 by welding for example, or in the alternative, the threaded jackscrew receiving member 56 may be an integral part of the butt plate where the butt plate 52 in the area in the jackscrew aperture is provided with threads. A threaded jackscrew assembly 58 is sized to operatively engage the receiving member 56. The pulley butt plate member has connecting bolt apertures 60*a*, 60*b* as shown in FIG. 6, for example. The thrust plate members 28*a*, 28*b* are preferably provided with threaded portions 62*a*, 62*b* at the periphery 64 of the connecting bolt apertures 60*a*, 60*b*. The connecting bolt apertures 60*a*, 60*b* of the pulley butt plate member 52 and the thrust plate members 28*a*, 28*b* are oppositely disposed in alignment when in operative relationship as shown in FIG. 6, for example. Connecting bolt members 68*a*, 68*b* are provided each passing through the oppositely disposed connecting bolt apertures 60*a*, 60*b* of a pulley butt plate member 52 and in engagement with the threaded portions 62*a*, 62*b* respectively of the thrust plate members 28*a*, 28*b*. The connecting bolt members may be of various lengths to accommodate different size pulley assemblies 12.

Utilizing the present invention when the puller 10 is operatively positioned on the pulley assembly 12, the jackscrew assembly 58 is progressively tightened so as to exert a push on the crankshaft 14 resulting in the pulley hub push members 44*a*, 44*b* exerting a force against the hub 50 or central portion of the one pulley 16 thereby causing the pulley assembly 12 to separate from the crankshaft 14 for easy removal without damage to the pulley assembly 12.

Figure 7:
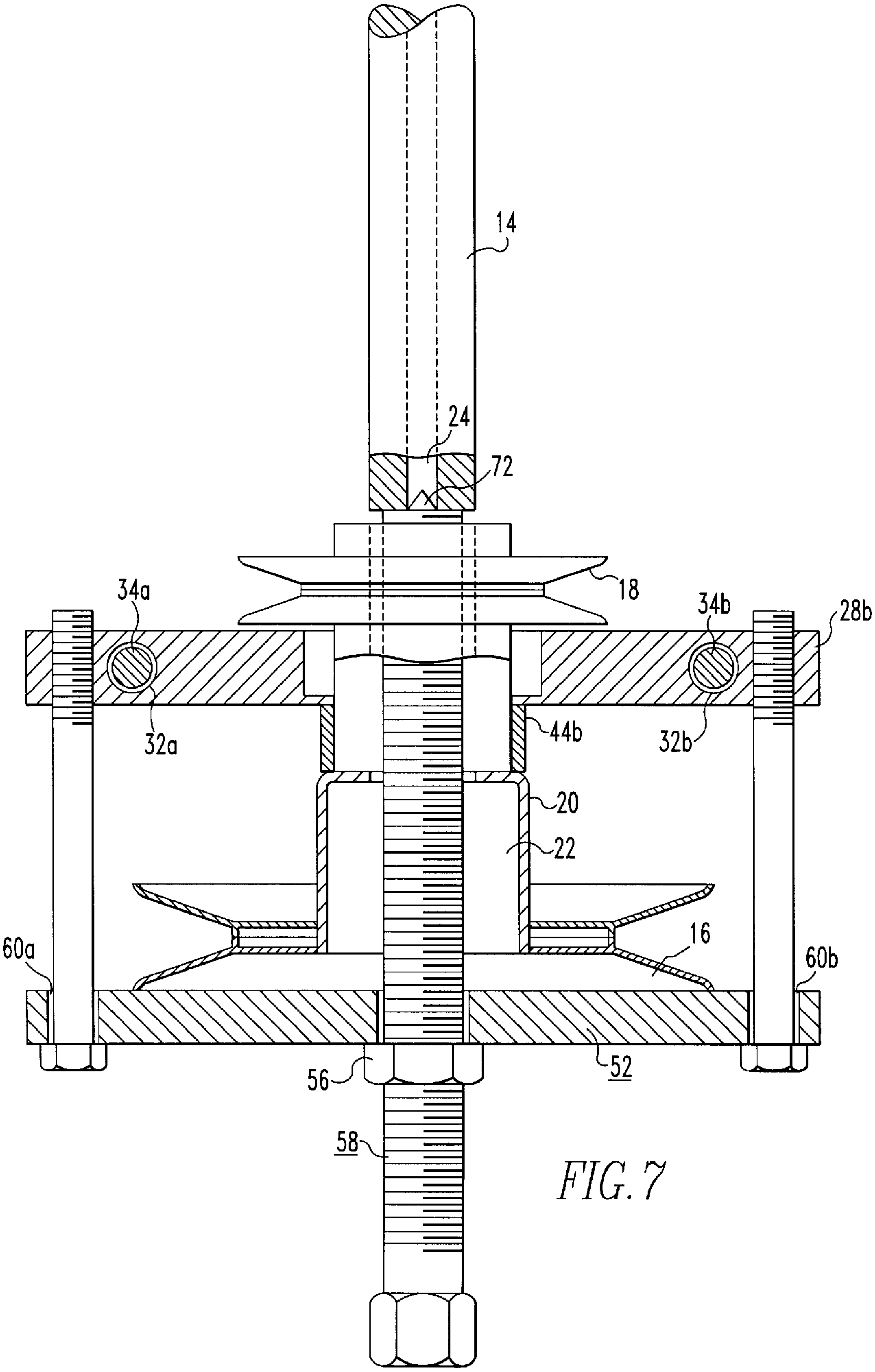
FIG. 7 is an elevational view of the puller in operative position with the pulley assembly partially in section showing the crankshaft removed from the pulley assembly.
Figure 12:
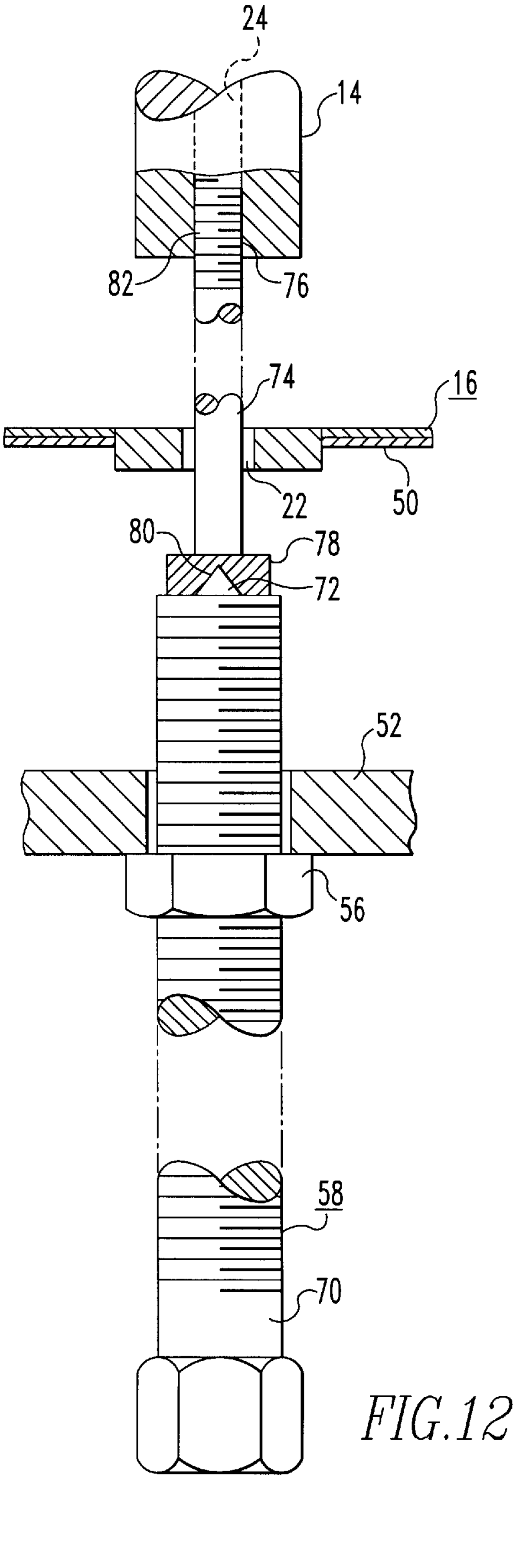
FIG. 12 is an elevational view partly in section showing the jackscrew assembly including the extension member engaging the crankshaft.

Preferably the jackscrew assembly 58 includes a threaded jackscrew 70 having a conical central extension portion 72 nearest the crankshaft 14 when in operative position as shown in FIGS. 6 and 7 for example. The conical extension portion 72 engages the crankshaft at the crankshaft aperture 24. This configuration of the jackscrew assembly 58 works well with the double pulley configuration shown in FIG. 6 for example. For the double pulley configuration as shown in FIG. 10, the crankshaft 14 proximate the crankshaft aperture 24 includes threaded portion 76. Preferably, for this pulley configuration, the jackscrew assembly 58 further includes an extension member 74 sized to fit through the central pulley aperture 22 and engage threaded portion 76 of the crankshaft 14 proximate the crankshaft aperture 24. Preferably the extension member 74 at one end 78 has a central recess 80 therein shaped to mate with the conical extension portion 72 of the jackscrew 70 as shown in FIG. 10. Preferably the extension member 74 at the other end 82 is threaded. In the second pulley configuration shown in FIG. 10 the extension member 74 is sized to pass through the pulley aperture 22, as shown in FIGS. 10 and 12, and screw into the threaded portion 76 of the crankshaft 14. The one end 78 as stated mates with the conical portion 72 of the jackscrew 70. As the jackscrew 70 is screwed in, the pulley assembly 12 is removed from the crankshaft 14. The extension member 74 may be an appropriately sized bolt with the central recess 80 being machined into the one end 78 thereof as shown in FIG. 10.

Utilizing the puller 10 of the present invention to remove a pulley assembly as shown in the drawings is quite simple. The puller is assembled around the one large pulley 16, usually from beneath the tractor, by placing the pair of thrust plate members 28*a*, 28*b* in position over the hollow tubular member of the pulley assembly 12. The thrust plate joining bolt members 34*a*, 34*b* are inserted into the thrust plate members and the joining bolt members 38*a*, 38*b* are tightened down on the thrust plate bolt members 34*a*, 34*b*. Depending on the configuration of the pulley assembly the appropriate jackscrew assembly is chosen and placed into position with the butt plate 52. The puller connecting bolt member 68*a*, 68*b* are then inserted through the jackplate and screwed into the thrust plate members 28*a*, 28*b* until the puller 10 is tight on the pulley assembly 12. The jackscrew is then screwed in for easy removal of the pulley assembly 12 from the crankshaft 14. The present invention is easy to use and adaptable to various multiple pulley configurations. As stated before, utilizing the present invention prevents damage to such pulley assemblies.

What is claimed is:

1. A puller useful in removing a pulley assembly from a crankshaft, said pulley assembly including at least one pulley affixed to a hollow tubular member, said hollow tubular member fixedly mounted on said crankshaft, said one pulley having a central aperture passing therethrough, said one pulley positioned proximate one end of said crankshaft, said crankshaft having a crankshaft aperture at said one end thereof, said puller comprising a pair of oppositely disposed thrust plate members, each of said oppositely disposed thrust plate members having thrust plate joining bolt apertures passing therethrough, the joining bolt apertures of one of said thrust plate members in alignment with the joining bolt apertures of the other of said thrust plate members when in operative relationship, thrust plate joining bolt members passing through said aligned joining bolt apertures, said joining bolt members each having a threaded portion at one end thereof, joining bolt nut members in threaded engagement with the threaded portion of said joining bolt members, each of said thrust plate members having a hollow tubular member engagement portion in the periphery thereof, said thrust plate members further including semi-circular pulley hub push members affixed to said thrust plate members at said tubular member engagement portion, said pulley hub push members of predetermined length and coaxially aligned with said hollow tubular member when in operative arrangement with said pulley assembly, a pulley butt plate member having a jackscrew aperture passing therethrough in coaxial alignment with said crankshaft, a threaded jackscrew receiving member in coaxial alignment with said jackscrew aperture, a threaded jackscrew assembly sized to operatively engage said receiving member, said pulley butt plate member having connecting bolt apertures passing therethrough, said thrust plate members having threaded portions at the periphery of said connecting bolt apertures, the connecting bolt apertures of said pulley butt plate member and said thrust plate members oppositely disposed when in operative relationship, connecting bolt members each passing through said oppositely disposed connecting bolt apertures and in engagement with said threaded portions of said thrust plate members, whereby when said puller is operatively positioned on said pulley assembly, said jackscrew assembly is progressively tightened so as to exert a push on said crankshaft resulting in said pulley hub push members exerting a force against the hub of said one pulley thereby causing said pulley assembly to separate from said crankshaft for easy removal without damage to said pulley assembly.

2. The puller of claim 1, wherein said pulley hub push members have a length greater than one-half the width of the grooved rim of said one pulley.

3. The puller of claim 1, wherein said jackscrew assembly includes a threaded jackscrew having a central conical extension portion nearest said crankshaft, said conical extension portion engages said crankshaft at said crankshaft aperture, when in operative position.

4. The puller of claim 3, wherein said crankshaft proximate said crankshaft aperture is threaded, said jackscrew assembly further comprises an extension member sized to fit through said central pulley aperture and engage the threaded portion of said crankshaft proximate said crankshaft aperture.

5. The puller of claim 4, wherein said extension member at one end thereof having a central recess therein shaped to mate with said conical extension portion of said jackscrew.

6. The puller of claim 5, wherein said extension member at the other end thereof is threaded, whereby said extension member may screw into the threaded portion of said crankshaft.

* * * * *